(12) United States Patent
Bajgrowicz et al.

(10) Patent No.: US 7,263,469 B2
(45) Date of Patent: Aug. 28, 2007

(54) MULTIPLE RF SIGNAL SWITCHING APPARATUS

(75) Inventors: Brian David Bajgrowicz, Indianapolis, IN (US); John Joseph Curtis, III, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/499,555

(22) PCT Filed: Dec. 16, 2002

(86) PCT No.: PCT/US02/40460

§ 371 (c)(1),
(2), (4) Date: Jun. 21, 2004

(87) PCT Pub. No.: WO03/056730

PCT Pub. Date: Jul. 10, 2003

(65) Prior Publication Data

US 2005/0054315 A1 Mar. 10, 2005

Related U.S. Application Data

(60) Provisional application No. 60/343,214, filed on Dec. 21, 2001.

(51) Int. Cl.
*H03F 1/26* (2006.01)
*H04B 15/00* (2006.01)

(52) U.S. Cl. .................. 702/189; 455/3.02; 455/3.04

(58) Field of Classification Search ............... 702/189; 375/316; 455/3.02, 3.04
See application file for complete search history.

(56) References Cited

U.S. PATENT DOCUMENTS 6,356,736 B2 * 3/2002 Tomasz et al. ............ 455/3.02
6,434,374 B1 * 8/2002 Muterspaugh ........... 455/234.1
6,480,551 B1 * 11/2002 Ohishi et al. .............. 375/260
6,486,907 B1 * 11/2002 Farber et al. ................ 725/78
6,980,529 B1 * 12/2005 Arsenault ................... 370/316

FOREIGN PATENT DOCUMENTS

EP 936763 8/1999

OTHER PUBLICATIONS

Search Report dated Apr. 30, 2003.

* cited by examiner

*Primary Examiner*—Marc S. Koff
*Assistant Examiner*—Janet L Suglo
(74) *Attorney, Agent, or Firm*—Joseph J. Lake; Robert D. Shedd; Brian J. Cromarty

(57) ABSTRACT

An RF multiple switching apparatus, such as one included in or coupled to a broadcast satellite signal receiver, having a plurality of multiple RF signal input ports for receiving respective ones of a plurality of RF signals, such as broadcast satellite television signals, utilizes a relative signal strength indicator, such as an automatic gain control signal, to determine the difference between the actual input signal that is present at one of the plurality of signal input ports and a false signal that appears to be present at another signal input port of the plurality of signal input ports due to the RF signal bleeding between the multiple signal input ports. During a setup configuration determination or routine, the switching apparatus steps through each RF signal input, extracts pertinent transmission network (such as a satellite transmission network) information, determines a relative signal strength indicator for the RF signal, and compares the obtained information. Setup data for each RF signal input is stored according to the comparison.

15 Claims, 4 Drawing Sheets

MULTIPLE RF SIGNAL SWITCHING APPARATUS

This application claims the benefit, under 35 U.S.C. § 365 of International Application PCT/US02/40460, filed Dec. 16, 2002, which was published in accordance with PCT Article 21(2) on Jul. 10, 2003 in English and which claims the benefit of U.S. Provisional patent application No. 60/343,214, filed Dec. 21, 2001.

The present invention concerns a signal switching apparatus capable of receiving multiple RF signals (hereinafter called a "multiple RF signal switching apparatus"), which apparatus may be built in or coupled to an RF signal receiver.

Undesirable leakage of RF signals among the different input signal ports (inputs) of a multiple RF signal switching apparatus, known as a "signal bleeding problem," may occur due to poor RF isolation. This signal bleeding problem is typically an issue in a sparse satellite transmission network where some of the transponders are missing, allowing strong signals on poorly isolated ports to bleed into another port and appear as a low level input signal.

For example, when trying to automatically detect the setup configuration for a receiver setup (e.g. transmission network, such as a satellite transmission network, versus multi-switch input port), it is necessary to step through each input of the multiple switching apparatus and analyze the signal content at the input. This is typically accomplished when a user starts using a receiver for the first time. Sometimes due to the relative strengths of the signals at different inputs and poor isolation between these inputs of the multiple switching apparatus, if a transponder is missing or nothing is connected to one of the inputs, then it is possible to detect a weak signal from one input port even though the switch selection has the output connected with a different input port. This causes confusion because the receiver is detecting the same signal connected to two or more different inputs simultaneously.

Methods have been developed to automatically determine the configuration of a receiver setup. These methods use a "mapping" methodology to step through each input to a multiple switching apparatus. Each input is examined to determine the origin (such as a satellite transmission network or other kind of transmission network which transmitted the signal) of the input signal. Problems with this approach, however, can occur if the same signal is incorrectly detected at multiple inputs of the apparatus.

It would thus be desirable in view of the above to have a multiple switching apparatus having an automatic signal input detection, which is operative to ascertain the signal(s) bled through.

It would thus be further desirable in view of the above to have an RF signal receiving system and/or receiver incorporating a multiple RF signal switching apparatus having an automatic signal detection routine, which is operative to ascertain the signal(s) bled through with regard to the various inputs of the multiple signal switching apparatus.

It would thus be yet further desirable in view of the above to have an automatic setup configuration system in a receiver, which is operative to ascertain the signal(s) bled through with regard to the various inputs of the multiple signal switching apparatus.

The subject invention involves a multiple RF signal switching apparatus, which is operative to determine signal input configuration.

In one form, there is provided a method of determining RF signal input configuration of a multiple RF signal switching apparatus having multiple RF signal input ports comprising the steps of: (a) extracting first information from a first RF is signal at a first port of a plurality of signal input ports; (b) determining a first indicator for the first RF signal; (c) extracting second information from a second RF signal at a second port of the plurality of signal input port; (d) determining a second indicator for the second RF signal; (e) comparing the first indicator with the second indicator; and (f) storing one of the first and second information in response to the comparison.

In another form, there is provided an apparatus comprising: a plurality of signal input means, such as RF input ports, for receiving a respective plurality of RF input signals; memory means, such as a memory, for storing program instructions; and signal processing means, such as a microprocessor and signal processing circuitry controlled by the microprocessor, coupled to the memory means for processing the plurality of RF input signals in response to the program instructions, wherein the signal processing means (a) extracts first information, such as first transmission network information, from a first RF signal, such as a first broadcast satellite television signal supplied from a first low-noise block converter (LNB), at a first input means, such as a first RF input port, of the plurality of signal input means, (b) determines a first indicator, such as a first automatic gain control (AGC) signal level, for the first RF signal, (c) extracts second information, such as second transmission network information, from a second RF signal, such as a second broadcast satellite television signal supplied from a second LNB, at a second input means, such as a second RF signal input port, of the plurality of signal input means, (c) determines a second indicator, such as a second AGC signal level, for the second RF signal, (d) compare said first indicator with the second indicator, and (e) stores one of the first and second information in response to the comparison.

In the drawings.

Corresponding reference characters indicate corresponding parts throughout the several views.

The subject invention solves the above noted signal bleeding problem by providing a way to distinguish a signal path providing a "true" signal from other signal paths that provide a "bled" or "bleed-through" signal. Particularly, the subject invention involves a multiple RF signal switching apparatus, included in or coupled to an RF signal receiver, which is operative to determine a true signal path (input) by comparing a relative signal strength indicator (RSSI) for each one of the signals containing the same information based upon the fact that the level of a bled signal is different from that of the true signal.

Figure 1:
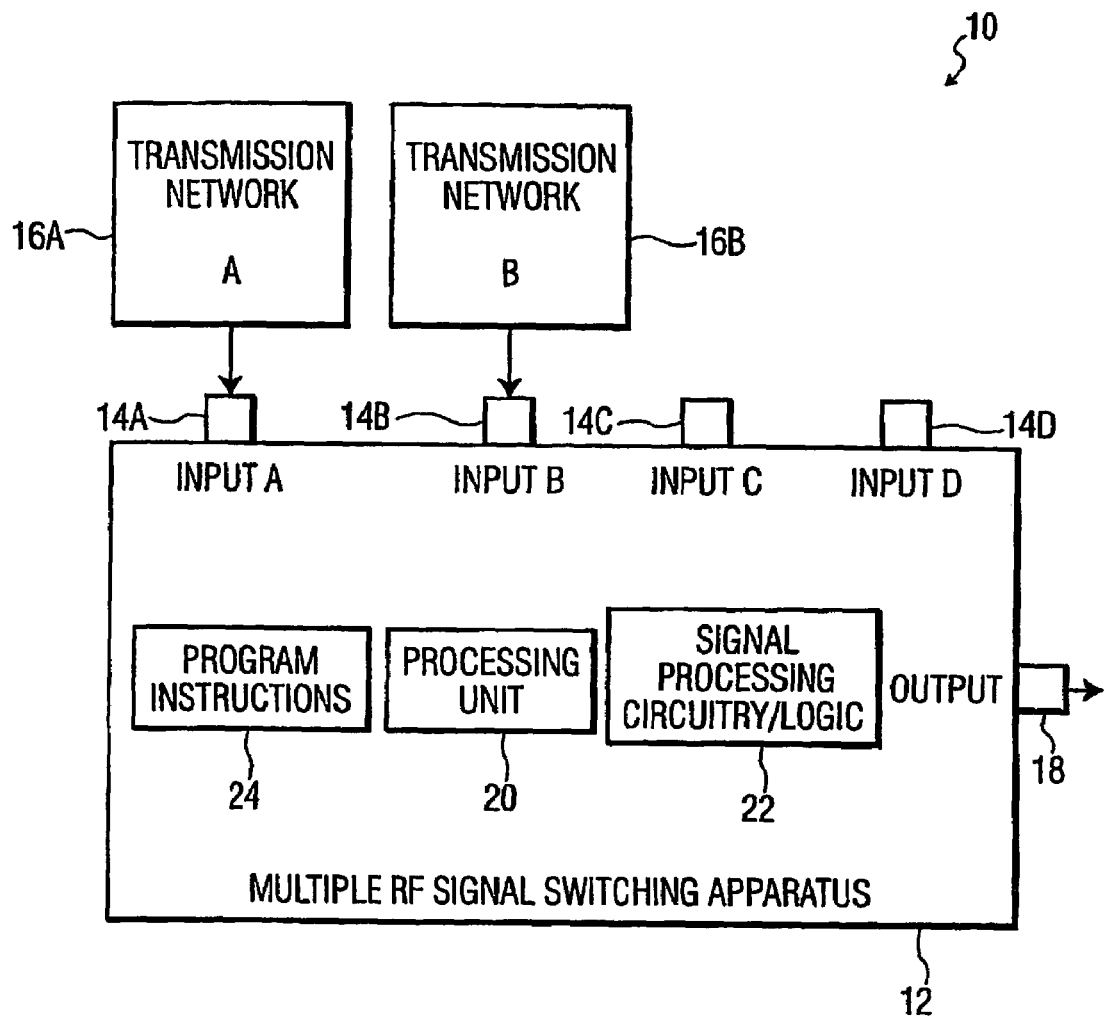
FIG. 1 is a block diagram of exemplary embodiment in accordance with the principles of the subject invention.

Referring now to FIG. 1, there is depicted an exemplary embodiment, generally designated 12, that utilizes the principles of the subject invention. It should be appreciated that multiple RF signal switching apparatus 12 is only representative of a type of embodiment in which the subject invention is utilized. The principles of the subject invention are, of course, applicable to other types of multiple RF signal switching apparatuses. Multiple switching apparatus 12 is generally part of a television or multi-media system. Needless to say, multiple RF signal switching apparatus 12 is operative, configured and/or adapted to receive and process RF signals, particularly, but not necessarily, satellite television signals. For example, RF signals could be VHF/UHF television signals or FM radio signals. Such RF signals may be analog and/or digital.

Multiple RF signal switching apparatus 12 has a plurality of RF signal inputs represented by signal input points or input ports 14A, 14B, 14C and 14D. It should be appreciated that switching apparatus 12 may have anywhere from two to any number of signal inputs/signal input ports 14 With four such inputs/input ports being only exemplary. Switching apparatus 12 is operative, configured and/or adapted to select an input for processing of a signal being provided to the particular input. Stated in another manner, switching apparatus 12 is operative, configured and/or adapted to select a signal from the various signal inputs/input ports 14A, 14B, 14C and 14D for processing. Processing of the selected signal is accomplished, in one manner, as is typical for satellite television signals in order to provide the signal to a display (not shown) and/or speakers (not shown). The processed signal is provided to an output or output port 18. A television signal receiver, such as television set or video cassette recorder, (not shown) or other similar device is typically connected to output port 18.

Switching apparatus 12 further has a processing unit, means or the like 20 such as a microprocessor. Processing unit 20 is operative, configured and/or adapted to control the various components of switching apparatus 12 (all of which are not necessarily shown) and/or part of system 10. Switching apparatus 12 also includes signal processing circuitry/logic 22 that is operative, configured and/or adapted to process the selected signal (i.e. the signal from a selected signal input port 14A, 14B, 14C and 14D). Program instructions 24 are also provided which are typically stored in a memory or storage device (not shown) of switching apparatus 12. The program instructions allow switching apparatus 12 and/or part of receiving system 10 to function as provided herein. Program instructions 24 may be resident in switching apparatus 12 or may be downloaded to switching apparatus 12.

Switching apparatus 12 is shown coupled to transmission network A 16A (such as a satellite transmission network) via input port A and transmission network B 16B (such as another satellite transmission network) via input port B. No connections are shown to input port C or input port D. Switching apparatus 12 is operative, configured and/or adapted to automatically detect the setup configuration of the inputs. The automatic routine steps through each input port to determine if a signal is present on the selected input port and thereafter, if a signal is detected, to analyze the signal content (i.e. determine various parameters for the detected signal). With respect to a digital signal, once a link layer has been acquired, the data in the signal can be checked for network origin information (such as "network_id" in the DirecTV™. system). When a particular port of switching apparatus 12 that is being examined lacks a transponder (in the case of a satellite transmission network), it is sometimes possible due to poor RF isolation between the input ports, to detect a signal that is coupling in from another input port. The automatic detection routine utilizes a relative signal strength indicator (RSSI) in order to determine the differences between a signal that is present at output port 18 of switching apparatus 12 or one that is "bleeding through" from another input port. In one form, the RSSI is an automatic gain control (AGC) level. A duplicate transponder, channel or the like on two input ports causes switching apparatus 12 to analyze the RSSI information to determine which input port has the original (non bleed-through) signal. This information is then stored in a memory of switching apparatus 12 as setup information.

Figure 2:
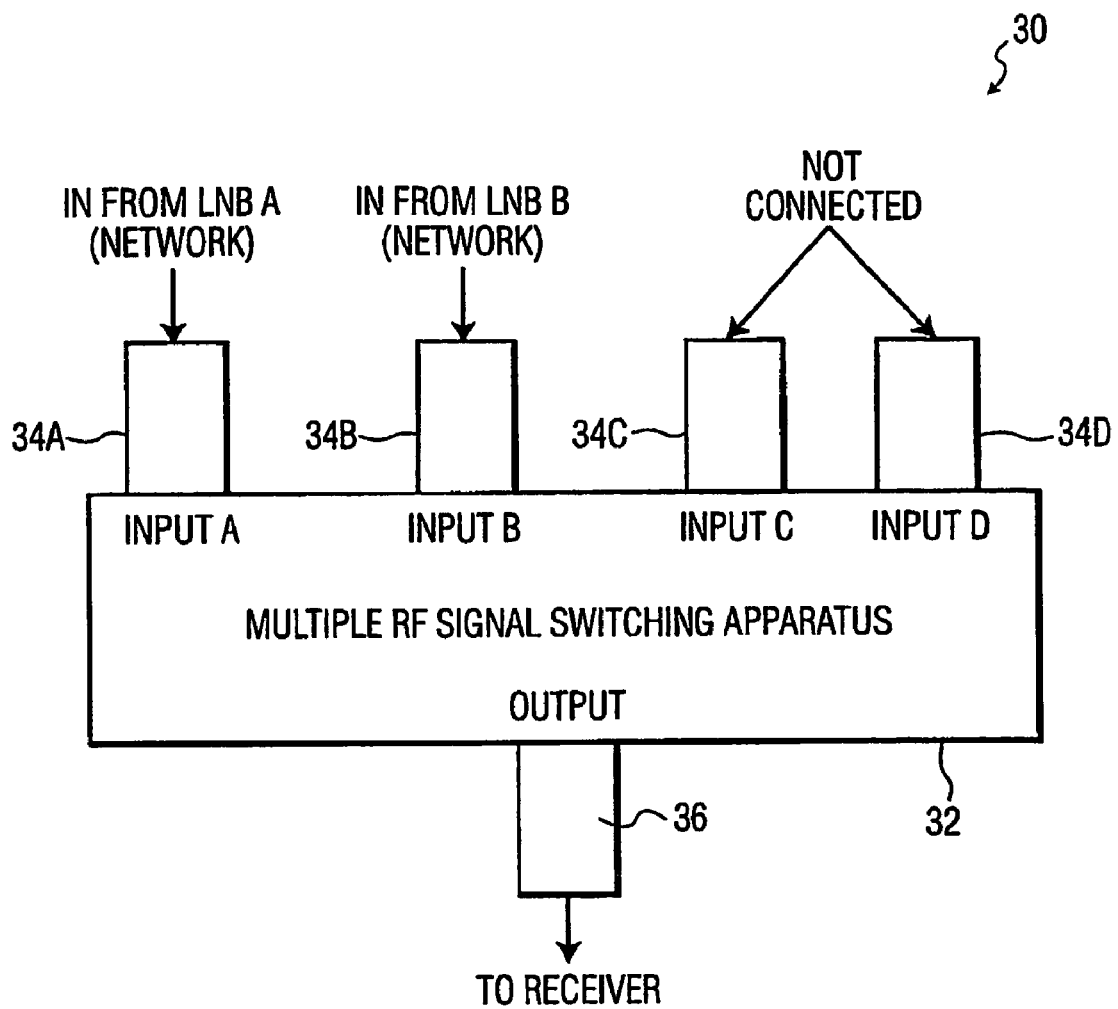
FIG. 2 is a block diagram of another exemplary embodiment in accordance with the principles of the subject invention.

Referring now to FIG. 2, there is depicted another exemplary embodiment, generally designated 32, in accordance with the principles of the subject invention. Multiple RF signal switching apparatus 32 may include the same type of components as described for multiple RF signal switching apparatus 12 or components that allow the selection of an input port from the input ports 34A, 34B, 34C and 34D such that its signal is provided to output 36 and thus an RF signal receiver. Input port 34A is coupled to an LNB A (not shown) included in transmission network A, while input port 34B is coupled to an LNB B (not shown) included in transmission network B. Input ports 34C and 34D are not coupled to a signal source. Multiple RF signal switching apparatus 32 routes one of the four different transmission network inputs to the satellite signal receiver (not shown).

Figure 4:
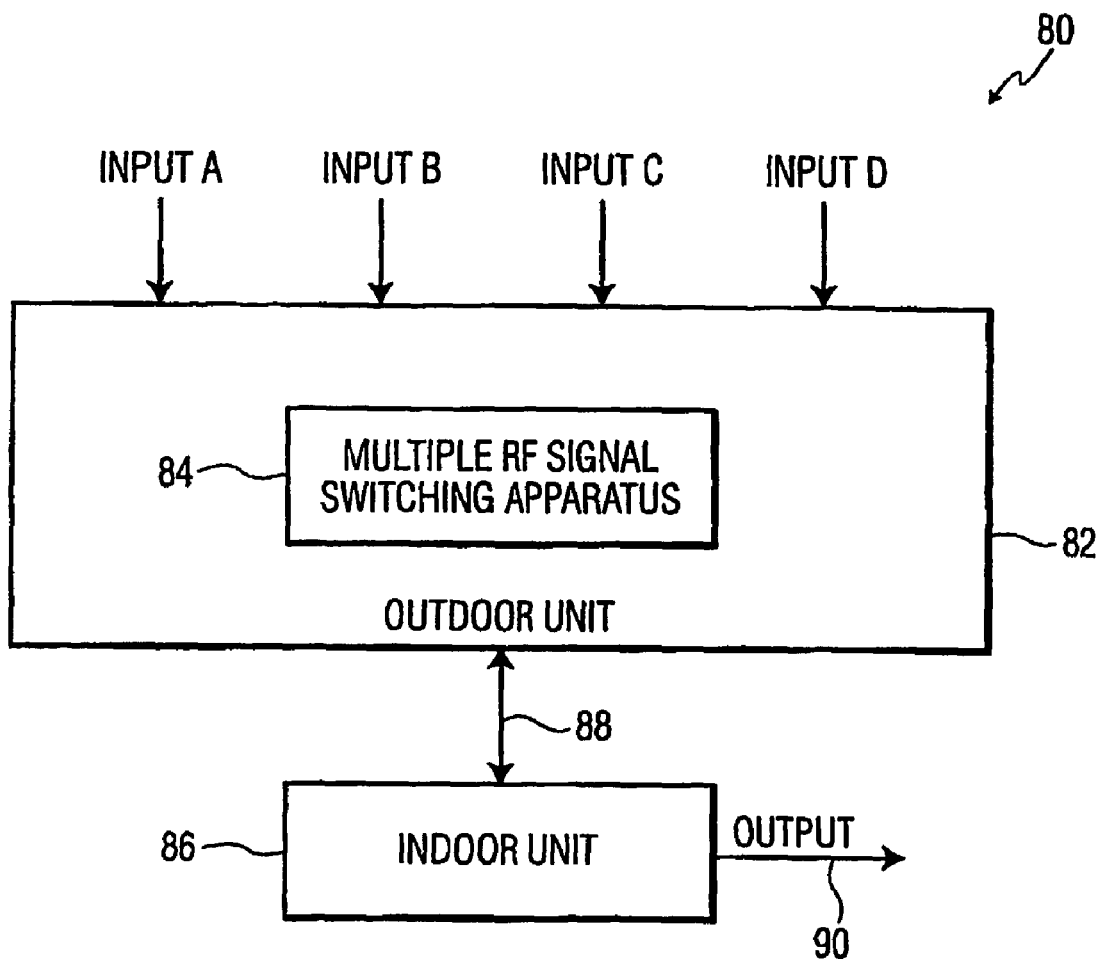
FIG. 4 is a block diagram of another exemplary embodiment in accordance with the principles of the subject invention.

In FIG. 4, there is depicted yet another exemplary embodiment of the subject invention included in a switching arrangement or system generally designated 80. In this system, multiple RF signal switching apparatus 84 having the same features, functions and/or characteristics as the other embodiments described herein is provided within outdoor unit 82 which is part of a satellite antenna assembly. Outdoor unit 82, and thus multiple RF switching apparatus 84, is shown with four inputs or input ports, namely input A, input B, input C and input D. Outdoor unit 82 is in communication with indoor unit 86, such as a set-top-box satellite signal receiver, via a communication line 88. Communication line 88 provides bi-directional communication between outdoor unit 82 including switching apparatus 84 and indoor unit 86. In one form, the communication line is a coaxial cable that provides an RF signal connection between outdoor unit 82 and indoor unit 86. Indoor unit 86 provides a processed output signal to a television signal receiver (not shown) or other similar device via an output signal path 90. Needless to say, indoor unit 86 may be incorporated in a television signal receiver as a built-in satellite signal processing unit.

Indoor unit 86 is operative to generate and provide a control signal to outdoor unit 82 in order to control switching apparatus 84. Particularly, the control signal is provided to outdoor unit 82 in order to select a particular input port and thus any signal therefrom. In one form, the control signal can be a tone such as a 22 kHz modulated tone signal generated at indoor unit 86. The tone causes outdoor unit 82 to select an input port in order to obtain the signal therefrom. The selection of a particular input port is for the set-up configuration process as well as program viewing.

In one form, an exemplary manner of operation may be described as follows. The automatic detection routine begins by selecting an input port from the available input ports, namely input port A, input port B, input port C and input port D. Furthermore, only inputs A and B have connections thereto (i.e. transmission networks A and B respectively). Inputs C and D are thus unused. Also, it is assumed for this example that the signal strength of the signal on input A (signal A) is at a level of −30 dBm and the signal on input B (signal B) is at a level of −45 dBm.

Multiple RF signal switching apparatus selects input port A on the particular transponder tuned. The ID for transmission network A is found to be on port A on the particular transponder tuned. The AGC voltage signal (or other relative signal strength indicator) is determined. Here it is assumed that the AGC is 1.5 volts due to a relatively strong signal. This information is recorded and the switching apparatus then selects port B. The signal is acquired and the ID for transmission network B is found on input B. This information, as well as the AGC voltage, is recorded as previously done for port A. The switching apparatus then selects port C because all input ports have not been searched for signals yet. Because the various input ports only have a particular level (e.g. 20 dB) of isolation between the various input ports, and there is no signal connected to Input C, the signal from input port A may bleed into the input port C path. Since the level of the signal on the output of the switching apparatus is approximately −50 dBm (20 dB below the −30 dBm signal on input port A, which is well within realistic input power levels), the signal is acquired and the ID for transmission network A is found to be on input port C.

However, the AGC voltage this time reads 4V. This reflects the added gain needed for a weaker signal. As such, with the same network ID located on two input ports, the comparison of the AGC levels reveals which is the stronger signal. If it is assumed that a lower AGC voltage corresponds to less gain needed and thus stronger signals at the particular input, then signal A is truly found on input A and the signal at input C is deemed to be a false signal. The information for input port A is thus retained while the information for input port C is discarded.

Additional transponder frequencies can now be tried to truly determine what signal is connected to input port C if any. In the case of a sparse network where only certain frequencies are being utilized, this step will be needed to avoid detecting the wrong network or missing the presence of a network completely. If only network A is found on input port C and the AGC voltage is always higher on input port C, then it will be known that there is not a signal connected at input port C once all possible transponders have been tried. The switching apparatus now selects input port D. If the same results as found on input port C apply here also, the same process as for input port C is performed and the connection configuration is now known and stored for use.

Figure 3:
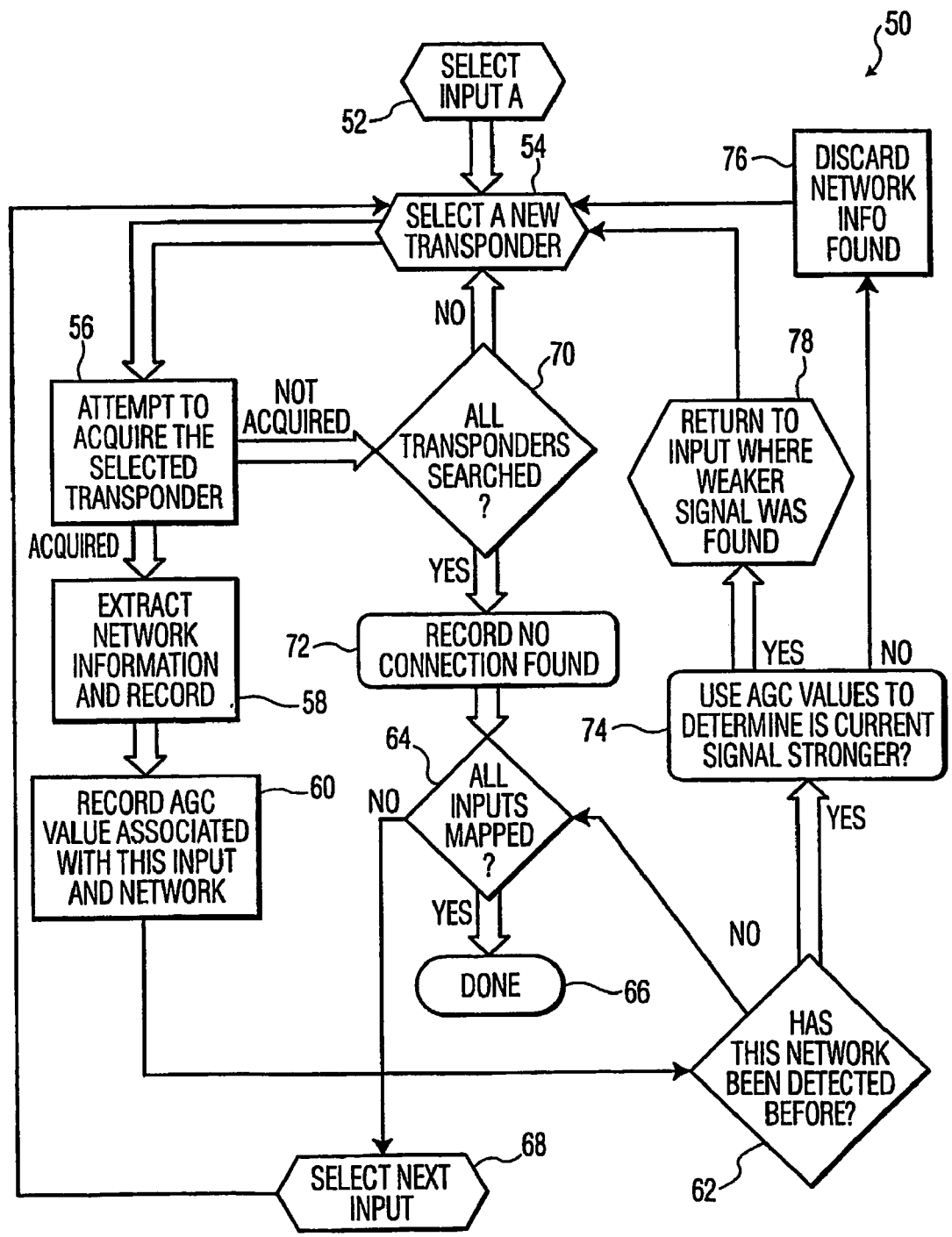
FIG. 3 is a flowchart of an exemplary manner of operation of the subject invention.

With additional reference to FIG. 3, there is shown a flowchart, generally designated 50, of a manner of operation of the subject invention. While this manner of operation is with respect to multiple RF signal switching apparatus 12 of FIG. 1, multiple RF signal switching apparatus 32 of FIG. 2, and multiple RF signal switching apparatus 84 of FIG. 4, the manner of operation of FIG. 3 will be explained with particular reference to multiple RF signal switching apparatus 32 of FIG. 2.

At step 52 the automatic setup configuration routine begins. In step 52, an input (here Input A) is selected. Once the input is selected, a particular transponder is selected, step 54. The various transponders (i.e. each one of which is an approximately 20 MHz wide digital channel) are known by the switching apparatus. In step 56, the switching apparatus attempts to acquire the selected transponder. If the selected transponder is acquired, then in step 58, transmission network information, such as satellite data, is extracted from the signal and the information/data is recorded. Thereafter, in step 60 the relative signal strength indicator (here the AGC value) associated with the input and transmission network is recorded. In step 62 it is determined whether this particular transmission network has been detected before. If this particular transmission network has not been detected before, the system then checks to determine whether all input ports have been mapped, step 64. When all input ports have been mapped, the system is done, step 66.

However, if all of the input ports have not been mapped, another input port is selected, step 68. The switching apparatus then repeats step 54. At step 62, the switching apparatus again determines whether the selected input port has been before detected. If the switching apparatus has previously detected the transmission network, the automatic gain control (AGC) signal (or other RSSI) is compared with the automatic gain control signal (or other RSSI) of the same previously detected transmission network, step 74. If it is determined that the signal currently being examined is not stronger than the previously obtained signal of the same transmission network, the currently stored information is discarded, step 76. Thereafter, in step 54 a new transponder is selected and step 56 is repeated. If however, in step 74 it is determined that the current is stronger, in step 78 the routine returns to the input port where the weaker signal was located and a new transponder is selected, step 54.

During step 56, when the routine is attempting to acquire the selected transponder, if the selected transponder is not acquired, the routine determines, in step 70 whether all transponders have been searched. An answer in the negative returns the routine to step 54 where another transponder is selected. An answer in the positive to step 70 records no connection found, step 72. Thereafter, in step 64 it is determined whether all inputs have been mapped. If yes, then done, step 66. If not, then the next input is selected 68.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

The invention claimed is:

1. A method for determining RF signal input configuration comprising the steps of:
   extracting first information from a first RF signal at a first port of a plurality of signal input ports;
   determining a first indicator for said first RF signal;
   extracting second information from a second RF signal at a second port of said plurality of signal input port;
   determining a second indicator for said second RF signal;
   comparing said first information with said second information; and
   storing one of said first and second information if said first information is the same as said second information.

2. The method of claim 1, wherein said step of determining a first indicator includes determining a first automatic gain control signal for said first RF signal; and
   said step of determining a second indicator includes determining a second automatic gain control signal for said second RF signal.

3. The method of claim 1, wherein the step of extracting said first information from said first RF signal at said first port of said pluraliiy of signal input ports includes extracting first network information; and
   said step of extracting second information from said second RF signal at said second port of said plurality of signal input ports includes extracting second network information.

4. The method of claim 1, further comprising the step of repeating said steps of extracting said information, determining said indicator, and comparing said indicator for each one of remaining ports of said plurality of signal input ports.

5. The method of claim 1, wherein after each extraction step said method further comprises the steps of:
- selecting a transponder;
- attempting to acquire the selected transponder; and
- repeating said selection of a transponder and attempting to acquire said selected transponder until said selected transponder is acquired.

6. An apparatus comprising:
- a plurality of signal input ports for receiving a respective plurality of RF input signals;
- a memory for storing program instructions; and
- a signal processor coupled to said memory for processing said plurality of RF input signals in response to said program instructions, wherein said processor:
- extracts first information from a first RF signal at a first port of said plurality of signal input ports,
- determines a first indicator for said first RF signal;
- extract second information from a second RF signal at a second port of said plurality of signal input ports,
- determines a second indicator for said second RF signal,
- compare said first information with said second information, and
- stores one of said first and second information if said first information is the same as said second information.

7. The apparatus of claim 6, wherein said program instructions are operative to further cause said processor to:
- determine a first automatic gain control signal as said first indicator; and
- determine a second automatic gain control signal as said second indicator.

8. The apparatus of claim 6, wherein said program instructions are further operative to further cause said processor to:
- extract first network information from said first RF signal as said first information; and
- extract second network information from said second RF signal as said second information.

9. The apparatus of claim 6, wherein said program instructions are further operative to cause said processor to repeat said steps of extracting said information, determining said indicator, and comparing said indicator for each one of the remaining ports of said plurality of signal input ports.

10. The apparatus of claim 6, wherein said program instructions are further operative to cause said processor to:
- select a transponder;
- attempt to acquire the selected transponder; and
- repeat said selection of a transponder and attempting to acquire said selected transponder until said selected transponder is acquired.

11. An apparatus comprising:
- a plurality of signal input means for receiving a respective plurality of RF input signals;
- memory means for storing program instructions; and
- signal processing means coupled to said memory means for processing said plurality of RF input signals in response to said program instructions, wherein said signal processing means:
- extracts first information from a first RF signal at a first input means of said plurality of signal input means,
- determines a first indicator for said first RF signal;
- extract second information from a second RF signal at a second input means of said plurality of signal input means,
- determines a second indicator for said second RF signal.
- compare said first information with said second information, and
- stores one of said first and second information if said first information is the same as said second information.

12. The apparatus of claim 11, wherein said program instructions are operative to further cause said signal processing means to:
- determine a first automatic gain control signal as said first indicator; and
- determine a second automatic gain control signal as said second indicator.

13. The apparatus of claim 11, wherein said program instructions are further operative to further cause said signal processing means to:
- extract first network information from said first RF signal as said first information; and
- extract second network information from said second RF signal as said second information.

14. The apparatus of claim 11, wherein said program instructions are further operative to cause said signal processing means to repeat said steps of extracting said information, determining said indicator, and comparing said indicator for each one of the remaining input means of said plurality of signal input means.

15. The apparatus of claim 11, wherein said program instructions are further operative to cause said signal processing means to:
- select a transponder;
- attempt to acquire the selected transponder; and
- repeat said selection of a transponder and attempting to acquire said selected transponder until said selected transponder is acquired.

* * * * *